United States Patent [19]
Smith

[11] Patent Number: 6,138,966
[45] Date of Patent: *Oct. 31, 2000

[54] MONITOR/VCR SUPPORT TRAY

[76] Inventor: Steven A. Smith, 211 Prestwick Pl., Louisville, Ky. 40243

[*] Notice: This patent issued on a continued prosecution application filed under 37 CFR 1.53(d), and is subject to the twenty year patent term provisions of 35 U.S.C. 154(a)(2).

[21] Appl. No.: 09/243,046

[22] Filed: Feb. 3, 1999

Related U.S. Application Data

[63] Continuation-in-part of application No. 29/070,997, May 19, 1997.

[51] Int. Cl.[7] .................................................. F16M 11/00
[52] U.S. Cl. ........................ 248/176.1; 248/444; 108/43
[58] Field of Search ................................ 248/441.1, 444, 248/918, 445, 446, 450, 455, 463, 465, 176.1, 118, 208, 236; 108/43, 44, 46, 118.3

[56] References Cited

U.S. PATENT DOCUMENTS

| | | | |
|---|---|---|---|
| 527,108 | 10/1894 | Cooper | 108/43 |
| 1,501,116 | 7/1924 | Inge | 108/46 |
| 1,558,977 | 10/1925 | Gray | 108/46 |
| 1,652,774 | 12/1927 | Fraser et al. | 248/444 |
| 1,788,800 | 1/1931 | McGinley | 108/46 |
| 2,003,241 | 5/1935 | Brown | 108/43 |
| 3,991,966 | 11/1976 | Breer, II | 248/444 |
| 4,795,210 | 1/1989 | Milat | 108/43 |
| 4,858,796 | 8/1989 | Roth | 108/46 |
| 4,966,342 | 10/1990 | Noguera | 248/172 |
| 5,005,702 | 4/1991 | Davis et al. | 108/43 |
| 5,039,044 | 8/1991 | Sher | 248/176 |
| 5,042,670 | 8/1991 | Timberlake | 211/13 |
| 5,042,761 | 8/1991 | McBride et al. | 248/175 |
| 5,054,736 | 10/1991 | Champoux | 108/43 |
| 5,142,734 | 9/1992 | Looman et al. | 16/19 |
| 5,160,107 | 11/1992 | Perrault et al. | 248/327 |
| 5,598,786 | 2/1997 | Patterson | 108/43 |
| 5,833,200 | 11/1998 | Patterson | 108/43 |

*Primary Examiner*—Anita M. King
*Assistant Examiner*—Kimberly Wood
*Attorney, Agent, or Firm*—Carrithers Law Office; David W. Carrithers

[57] ABSTRACT

An adjustable support tray provides a VCR or other electronic device such for setting on the top of a monitor of a television or computer. The TV/monitor support tray for supporting a video cassette recorder on the upper sloped surface of a television or monitor includes a tray base having a generally flat surface and a rim extending around the periphery thereof. It includes a lip projecting downwardly from and extending along at least a portion of a front edge of the tray base. A base support member projects downwardly from the bottom surface of the tray base and includes at least one leg member adjustably engaging the base support member. A nut and screw assembly releasably hods the leg member to the base support member.

28 Claims, 6 Drawing Sheets

MONITOR/VCR SUPPORT TRAY

This is Continuation-In-Part of Ser. No. 29/070,997 filed on May 19, 1997.

BACKGROUND OF THE INVENTION

Conventional holding devices for television and computer monitors consist of furniture. Television monitors may be supported within an independent frame or set upon a table, or other such support structure. Computer monitors set upon a desk, credenza or other furniture designed for eye level use by the user. None of the support structures for televisions or computer monitors include an adjustable means for supporting additional electrical equipment or accessories on top of the monitor.

SUMMARY OF THE INVENTION

The instant invention is a tray having support members for removably mounting onto the top surface of a television or computer monitor. The tray defines a base for supporting electronic equipment such as a video cassette recorder, ("VCR"), speakers, tape deck, video cameras, cassette trays, or other accessories and related equipment for use with a monitor. The monitor may be supported within an independent frame, supported by furniture, or suspended by a swivel arm or the like.

It is an object of the present invention to provide a shelf for supporting electrical equipment or for use as a storage area for tapes utilizing unconventional space above a monitor.

It is another object of the present invention to provide a shelf or tray which utilizes adjustable support means defining legs adaptable for use with an inclined or unlevel mounting surface for providing a generally flat tray support surface.

It is an object of the present invention to be sized for use with monitors having a particular size ranges and exterior features.

It is another object of the present invention to accommodate the weight of a conventional VCR providing structural stability for holding the VCR in position.

It is another object of the present invention to provide a tray having a pleasing appearance.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF THE INVENTION

In reference to FIGS. 1–8, a preferred embodiment of the TV/monitor support tray 10 of the present invention is shown. The components of the preferred embodiment are molded from ABS or polycarbonate; however, it is contemplated that the materials of construction may be selected from wood, metals such as aluminum or stainless steel, or other synthetic polymers such as PVC, nylon, polyethylene, fiberglass, or combinations thereof.

Figure 1:
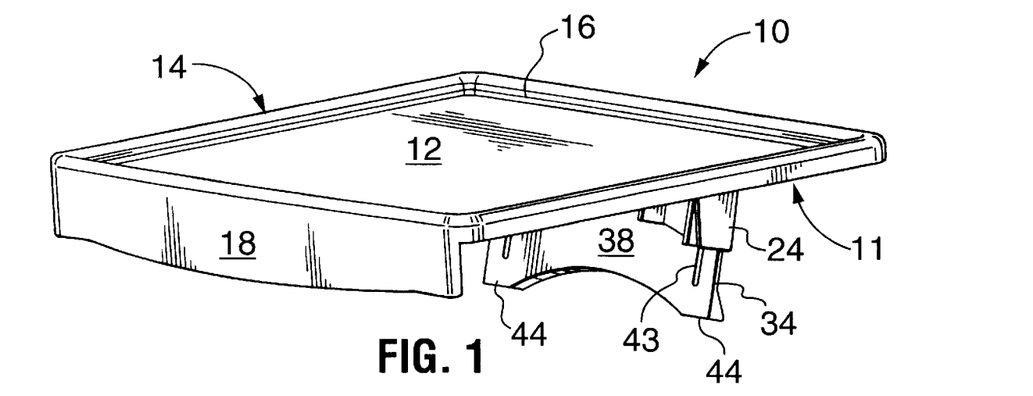
FIG. 1 is a perspective front view of the present invention showing the tray having a flat base surface with a rim extending around the periphery thereof, an overhanging lip extending downward from the front edge, and an adjustable leg assembly extending downwardly from the bottom of the base for supporting the tray in a level manner.

The tray 10 of the present invention has a main body forming a tray base 11 having flat support surface 12. As shown in FIG. 1, the support surface is continuous; however, holes, slots, protrusions, channels, dimples may be formed therein to increase frictional contact of objects setting thereon or to reduce weight may be incorporated therewith. In addition a non-slip coating or a thin elastomer or rubber based material may be incorporated integrally therewith, applied thereto, or used in combination therewith to increase the frictional coefficient of the support surface 12. The support surface 12 may be fabricated in a thin sheet of material, a sheet of material having support webbing underneath, or a sheet of material having a top surface, a bottom surface, and an interior filled with webbing, honeycomb, or foam for providing lightweight structural rigidity thereto.

Figure 2:
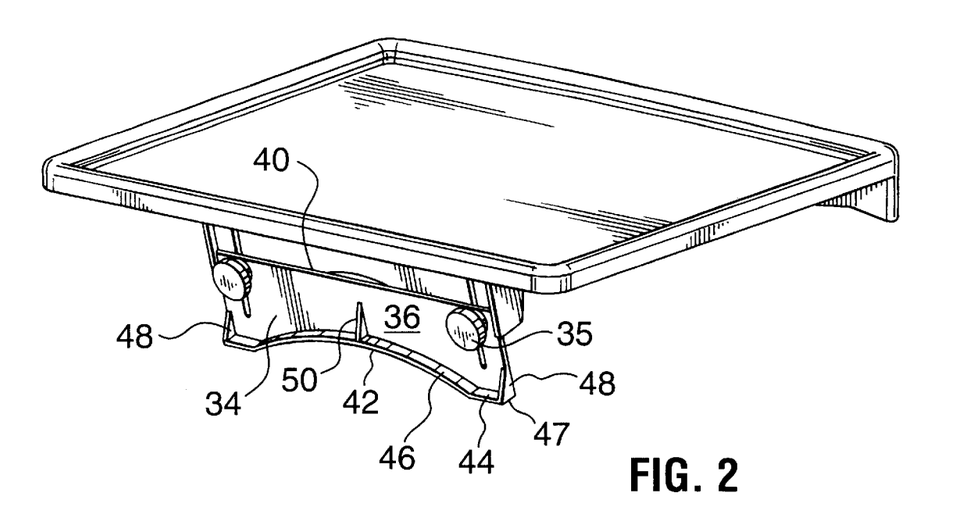
FIG. 2 is a perspective rear view of FIG. 1, showing the adjustable leg assembly.
Figure 7:
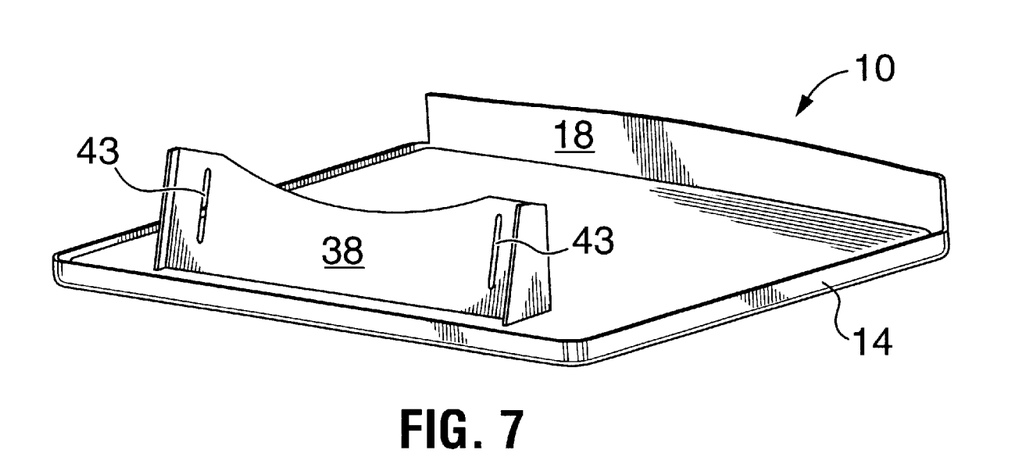
FIG. 7 is an inverted rear perspective view showing the tray base of FIG. 5.
Figure 8:
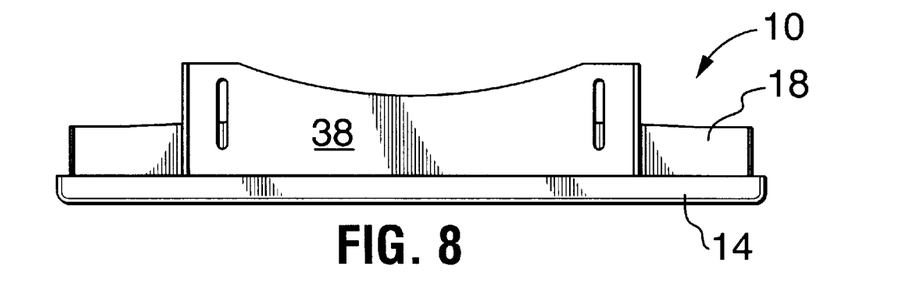
FIG. 8 is an inverted rear view showing the tray base of FIG. 5.

As illustrated best in FIGS. 1–2 and 7, the tray base 11 is formed having an integral rim 14 extending around the periphery of the support surface 12 providing a lip 16 extending above the support surface 12 to aid in holding objects thereon. Of course the rim 14 may be manufactured separately from the support surface 12 and attached thereto by means for holding such as tabs, adhesives, or a tongue and groove arrangement.

In the preferred embodiment, a downwardly projecting flange or lip 18 extends across generally normal to and formed integrally with the front edge 20 of the tray base 11. It is contemplated that the lip 18 be formed in one or more sections or portions, so long as the lip 18 provides a means of extending over the front of the monitor hooking thereto for preventing backward slippage of the base tray 11. The lip 18 also be attached to the front edge 20 of the tray base 11 by an adhesive, tongue and groove arrangement, screws or other fastening means. In the preferred embodiment the lip 18 extends downwardly at an angle of from between about 80 to 90 degrees, and preferably at an angle of from between about 85 and 90 degrees.

Figure 3:
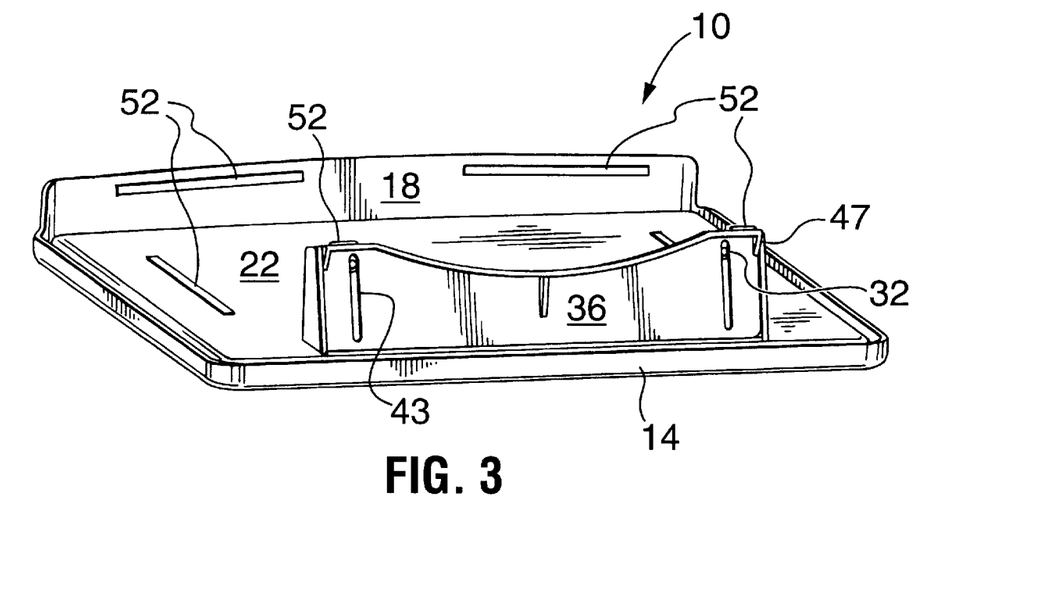
FIG. 3 is an inverted rear perspective view showing the tray base of FIG. 1.
Figure 4:
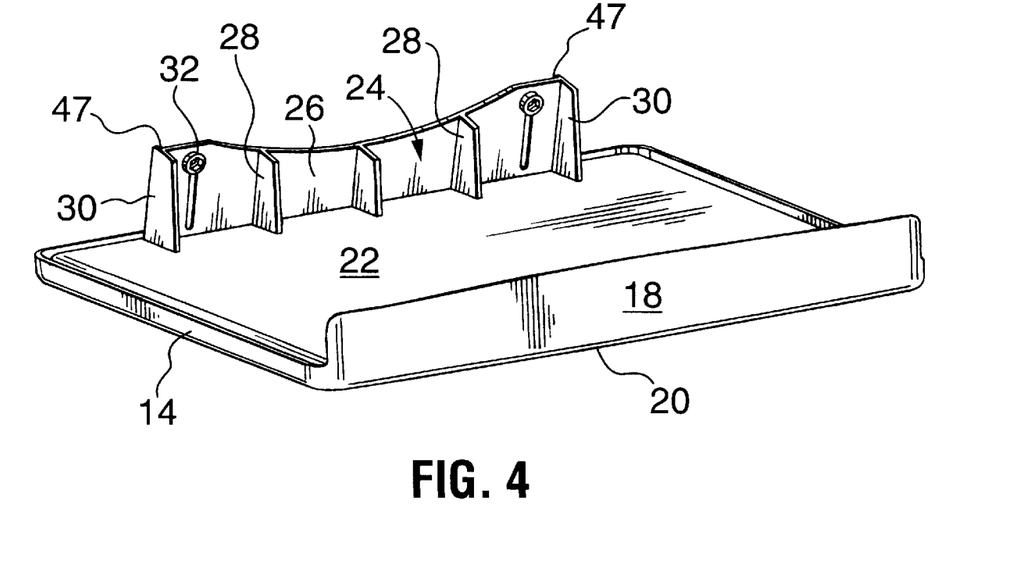
FIG. 4 is an inverted front perspective view showing the tray base of FIG. 1
Figure 5:
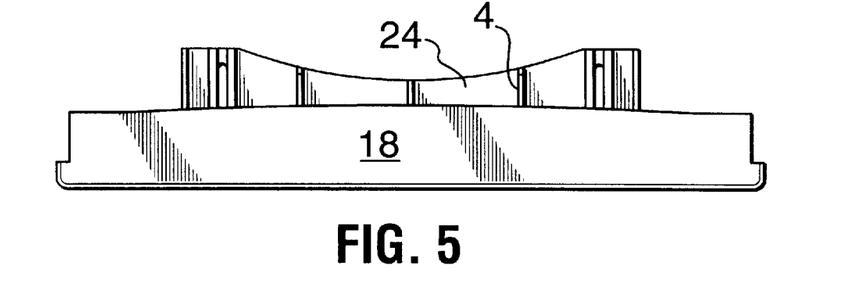
FIG. 5 is an inverted front view showing an alternate embodiment of the tray base of FIG. 1.
Figure 6:
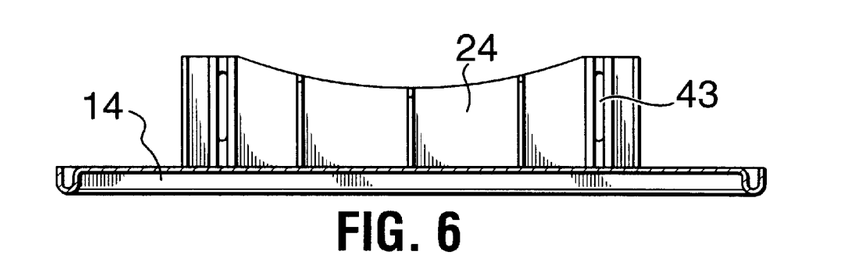
FIG. 6 is an inverted partial cut-away front view showing the interior side of the rear leg assembly extending from the tray base of FIG. 5.

Projecting generally perpendicular from the bottom surface 22 of the base tray 11, opposite the lip 18 is a base support member 24. In the preferred embodiment, the base support member 24 is formed integrally with the base tray 11; however, it is contemplated that the base support member 24 can be fabricated as a separate piece or pieces and attached to the base tray 11 by adhesives, welding, screws or other means of attachment. Moreover, the base support member 24 could be formed in two or more pieces. As best shown in FIGS. 3 and 4, the base support member 24 had a smooth flat exterior surface. The inner surface 26 includes a plurality of intermediate brace members 28 positioned inbetween a pair of end brace members 30 connecting the inner surface 26 with the bottom surface 22 of the base tray 11. The preferred embodiment includes at least one pair of holding members 32 such as wing nuts are affixed to the inner surface 26 of the base support member 24 for cooperative engagement with means for holding such as screws or bolts having a head threadably engaging the holding members 32 for supporting one or more adjustable leg members 34; however, it is contemplated that the leg members 34 could be formed integrally with the base support members 24 and sized for monitors of specific dimensions. As shown in the preferred embodiment the a head defines a knob 35 for manually grasping.

The adjustable leg member 34 is best illustrated in FIGS. 1 and 2. The leg member 34 is formed having a generally flat main body 36 in corresponding size to the base support member 24 with a flat interior surface 38 for cooperative sliding engagement therewith. The main body 36 of the preferred embodiment has a generally straight top edge 40 and a upwardly curved bottom edge 42 forming a pair of projecting legs 44 on each side. The leg member 34 includes means for adjustment defining a pair of vertical slots 43 alignable with the holding members 32 for cooperative engagement therewith. The bottom edge 42 of each leg member 34 is formed having a flange 46 extending therealong outwardly toward the rear thereof defining a foot 47. A pair of side brace flanges 48 and a center brace flange 50 connect the flange 46 with the leg member 34 for additional structural support. As shown in the preferred embodiment the leg member 34 is slanted inwardly toward the monitor at a slight angle. The angled position is an important feature for distribution of the weight and for holding the tray 10 onto the slick surface of the monitor for the slight angle of the support member 34 biases the lip 18 slightly against monitor providing increased stability and holding. It is contemplated that the leg member 34 may be formed of a plurality of members cooperatively engaged with the support member 24.

As shown best in FIG. 3, pads 52 formed of rubber, elastomer, or synthetic material may be permanently or removably attached to the interior surface of the lip 18, the bottom surface 22 of the base tray 11, or the bottom surface of the feet 47 to cushion and hold the tray 10 in position upon the monitor. In the preferred embodiment, the pads 52 are formed of open cell neoprene strips; however, any material having elastomeric properties may be used as well. Moreover, the pads 52 are preferably attached to the tray 11 with an adhesive, but the pad surface contacting the monitor does not contain an adhesive. It is also contemplated velcro strips may be applied to one or more of the same application points of the tray 10 and corresponding points on the monitor for removably holding the tray 10 in place on the monitor. The pads 52 rest upon the front and top surfaces of the monitor in order to provide a cushioned padded surface and a non-slip high friction surface.

To use the tray 10, simply place the tray 11 on top of a monitor so that the lip 18 is contiguous with the front of the monitor and adjust the holding members 32 so that the leg members 34 are the proper length and resting on the included monitor housing to provide a level support surface for the tray 10.

FIGS. 9–12 illustrate an alternate embodiment of the present invention. The tray 100 includes a tray base 111 having flat support surface 112. The support surface is continuous; however, holes, slots, protrusions, channels, dimples may be formed therein to increase frictional contact of objects setting thereon or to reduce weight may be incorporated therewith. In addition a non-slip coating or a thin elastomer or rubber based material may be incorporated integrally therewith, applied thereto, or used in combination therewith to increase the frictional coefficient of the support surface 112. The support surface 112 may be fabricated in a thin sheet of material, a sheet of material having support webbing underneath, or a sheet of material having a top surface, a bottom surface, and an interior filled with webbing, honeycomb, or foam for providing lightweight structural rigidity thereto.

The tray base 111 is formed having an integral rim 114 extending around the periphery of the support surface 112 providing a holding flange or lip 116 extending above the support surface 112 to aid in holding objects thereon. The rim 114 may be manufactured separately from the support surface 112 and attached thereto by means for holding such as tabs, adhesives, or a tongue and groove arrangement.

A plurality of spaced apart upwardly projecting flanges 118 extends a selected distance from the side of the lip 118 forming slots or recesses 120 for holding cartridges such as video tapes thereinbetween. The central region 121 between the recesses 120 is flat and adapted for holding a VCR or other object.

Projecting generally perpendicular from the bottom surface of the base tray 111 are a plurality of spaced apart brace members including a rear brace member 113 extending across the back of the base tray 111, a front brace member 115 extending across the front of the tray 111, and at least intermediate brace member 117 positioned thereinbetween providing structural support and rigidity to the unit.

Figure 9:
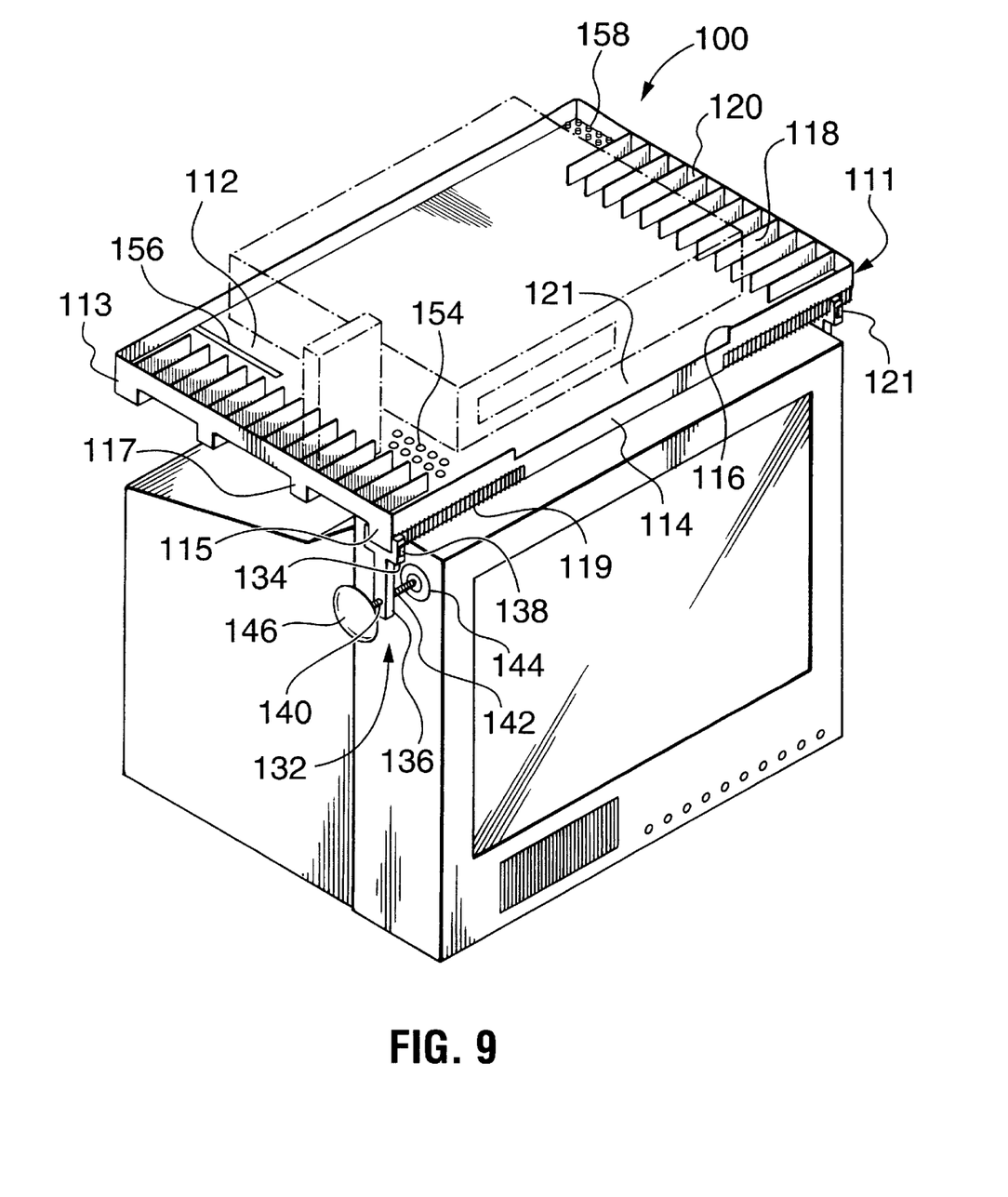
FIG. 9 is a perspective view of an alternate embodiment of a TV/Monitor support shelf in accordance with the present invention.
Figure 10:
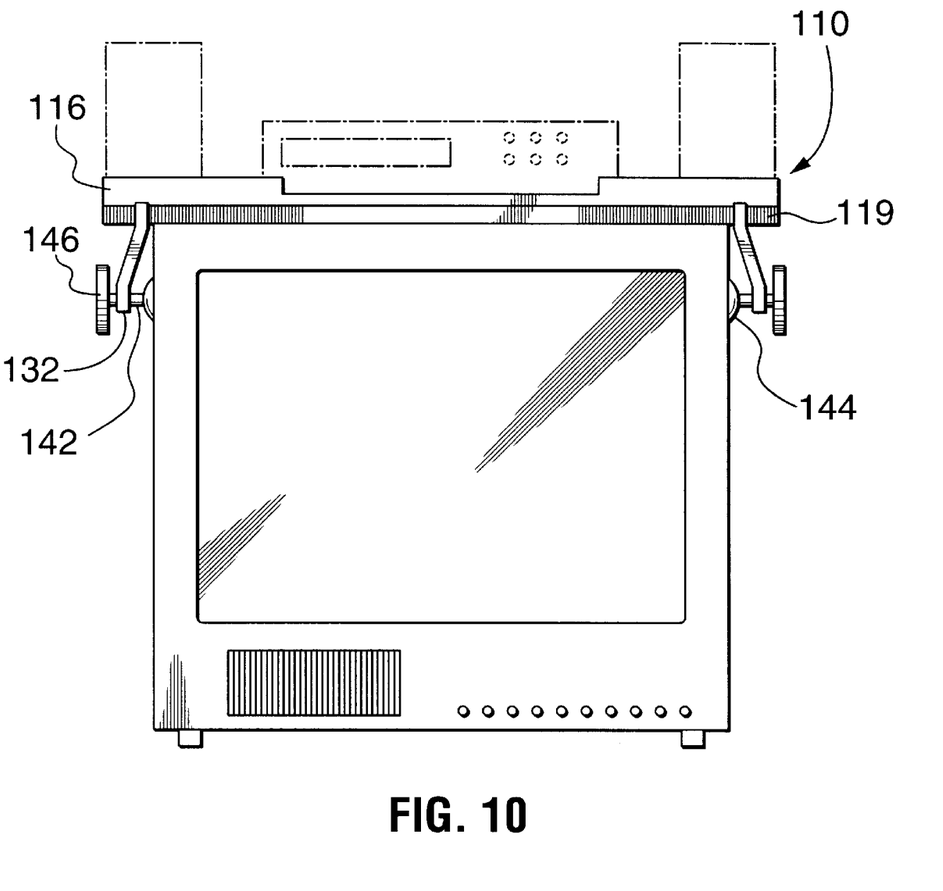
FIG. 10 is a front view showing the embodiment of FIG. 9.
Figure 11:
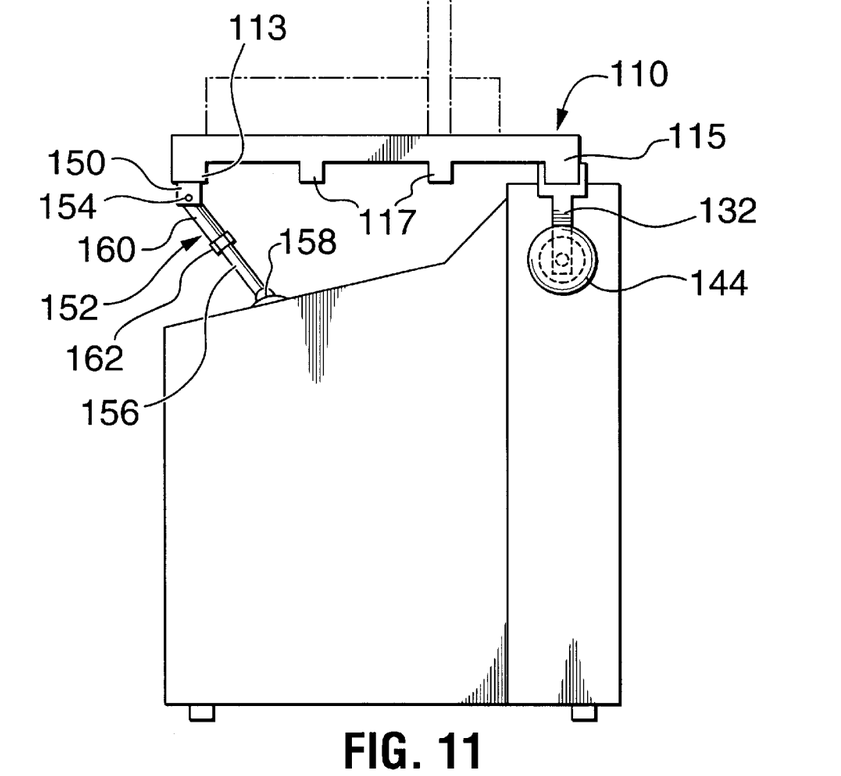
FIG. 11 is a side view showing the embodiment of FIG. 9.
Figure 12:
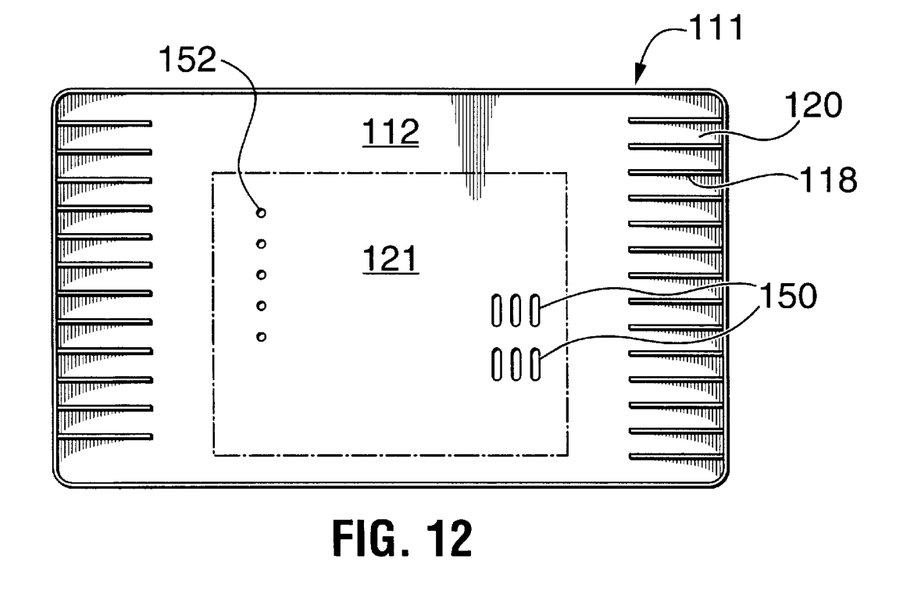
FIG. 12 is a top view showing the embodiment of FIGS. 9.

In the preferred embodiment, the base support members are formed integrally with the base tray 111; however, it is contemplated that the base support members 113, 115, and 117 can be fabricated as a separate piece or pieces and attached to the base tray 111 by adhesives, welding, screws or other means of attachment. As best shown in FIGS. 9 and 11, the base support members are longitudinal members have a rectangular cross sectional dimension. The front brace members 115 include ribs 119 formed within the lower portion of the side surfaces 121 extending inwardly a selected distance from the distal ends.

The embodiment as shown in FIGS. 9–12 include a pair of holding members 132 consisting of a "T-shaped member defining a fork 134 having a longitudinal body 136 with a distal end spread apart from one another for cooperative engagement with the ribs 119 of the front brace member 115. A spring loaded plunger 138 provides means for engaging and disengaging the holding member 132 with the ribs 119 thereby allowing sliding adjustment of the holding members 132 with respect to the front brace member 115.

Each holding member 132 includes a threaded hole 140 therethrough for threaded engagement with a screw 142 having a base pad 144 on the distal end touching the side surface of the monitor and a knob 146 on the opposite distal end for adjusting the screw to tighten the base pads 144 on opposite sides of the monitor for removably securing the tray 111 thereto.

A pair of adjustable leg member 148 is best illustrated in FIG. 11 support the rear portion of the tray base 111. A flange 150 having aligned holes therein projects downwardly from the bottom surface of the tray base 111. An extendible leg 152 having aligned holes therein is aligned with the flange 150 and pivotally connected thereto with a pin 154. The extending leg 152 includes a first leg member 156 extending upward from a swiveling support foot 158 resting on the monitor surface. The first leg member 156 is coaxially and slidably retained within a second leg member 160 providing a telescoping arrangement. Means for holding the first leg member 156 and the second leg member 160 in position at a selected length is accomplished by tightening a nut 162 in cooperative engagement positioned thereinbetween.

While particular embodiments of the invention have been shown and described, it should be understood that the invention is not limited thereto, since many modifications are possible within the scope of the appended claims. The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A support tray in combination with visual monitor for supporting electronic equipment on the top of said visual monitor having a vertical front surface and generally flat front top surface portion and a sloped rear top surface portion, comprising:

a tray base defining a top support surface having a generally flat surface and a rim extending around the periphery thereof, at least a portion of said tray base resting on the front top surface portion of said television or monitor;

a lip projecting downwardly from and extending along at least a portion of a front edge of said tray base for cooperatively engaging at least a portion of said front surface of said television or monitor;

a rear base support member projecting downwardly from a bottom surface of said tray base for resting on said sloped rear top surface portion of said television or monitor and providing a level top support surface;

one leg support member adjustably engaging said rear base support member; and means for releasably holding said one leg support member to said rear base support member.

2. The support tray of claim 1, being fabricated from materials selected from the group consisting of polycarbonate, wood, aluminum, stainless steel, PVC, nylon, polyethylene, fiberglass, and combinations thereof.

3. The support tray of claim 1, wherein said generally flat surface includes friction enhancing means selected from the group consisting essentially of holes, slots, protrusions, channels, or dimples.

4. The support tray of claim 1, including a non-slip coating.

5. The support tray of claim 1, wherein said lip projects downward from said tray base at an angle.

6. The support tray of claim 5, wherein said lip projects downward from said tray base at an angle of from between about 80 to 90 degrees.

7. The support tray of claim 1, said rear base support member including at least one brace member.

8. The support tray of claim 1, wherein said at least one leg support member adjustably engaging said rear base support member includes a main body having a flat interior surface for cooperative sliding engagement with said rear base support member, said rear base support member and said main body including a pair of vertical slots alignable with one another and including means for releasably holding said rear base support member and said main body in a selected position for cooperative engagement therewith.

9. The TV/monitor support tray of claim 1, wherein said means for releasably holding said leg member to said base support member comprises at least one nut and one screw securing said adjustable leg member to said support member.

10. The support tray of claim 8, wherein said adjustable leg member includes a flange extending therealong outwardly toward the rear thereof defining a foot.

11. The support tray of claim 1, wherein said base support member and said leg member are slanted inwardly toward the monitor at a slight angle.

12. The support tray of claim 1, wherein said leg member is slanted inwardly toward the monitor at a slight angle of from between 75 and 90 degrees for biasing said lip slightly against the monitor providing increased stability and holding.

13. The support tray of claim 1, including pads attaching co a bottom surface of said one leg support member, a bottom surface of said tray base, or an interior front surface of said lip.

14. The support tray of claim 13, said pads being selected from the group consisting of rubber, elastomer, neoprene, or velcro providing a cushioned non-slip high friction surface.

15. The support tray of claim 13, wherein said pads are permanently attached to said bottom surface or said one leg support member, a bottom surface or said tray base, or an interior front surface of said lip.

16. The support tray of claim 1, said lip projecting downwardly from and extending along at least a portion of a front edge of said tray base and cooperatively engaging a front vertical surface of said television or said visual monitor for preventing backward slippage of said base tray.

17. The support tray of claim 4, wherein a thin elastomer or rubber based material is applied to said top surface of said tray base.

18. The support tray of claim 4, wherein a thin elastomer or rubber based material is incorporated integrally with said top surface of said tray base.

19. A visual monitor support tray for supporting a electronic equipment on the top surface of a visual monitor, comprising:

said visual monitor having a generally vertical front surface and a top surface including a generally level front top surface portion and a sloped rear top surface portion;

a tray including a top surface and a bottom surface and defining a front edge and rear edge with connecting side edges, said bottom surface including a front portion resting on said front top surface portion of said visual monitor;

at least one lip projecting downwardly from said front edge of said tray extending along at least a portion thereof cooperatively engaging at least a portion of said front vertical surface of said visual monitor;

at least one rear support member attaching to and projecting downwardly from said bottom surface of said tray supporting said tray on said sloped rear top surface portion of said visual monitor providing a level top support surface; and means for adjusting said at least one rear support member leveling said tray.

20. The visual monitor support tray of claim 19, wherein said means for adjusting said at least one rear support member is at least one leg support member cooperatively engaging said at least one rear support member.

21. The visual monitor support tray of claim 20, including means for releasably holding said at least one leg support member co said at least one rear support member.

22. The visual monitor support tray of claim 19, wherein said at least one rear support member is integrally formed with said tray.

23. The visual monitor support tray of claim 19, wherein said at least one lip is integrally formed with said tray.

24. The visual monitor support tray of claim 19, including a rim extending around the periphery of said tray edge projecting above the top surface thereof.

25. The visual monitor support tray of claim 21, wherein said at least one rear support member projecting downwardly from said bottom surface of said base defines a bottom edge and a pair of opposing corners extending downwardly further than a center section thereinbetween defining a pair of legs.

26. The support tray of claim 21, including a rim extending around at least a portion of the periphery of said base cooperatively engaging said rear edge and said pair of side edges.

27. The visual support tray of claim 21, including a rim extending around at least a portion of the periphery of said base cooperatively engaging said rear edge and said pair of side edges and intersecting said front edge.

28. The visual monitor support tray of claim 21, wherein said electronic equipment is selected from the group consisting of a video cassette recorder, a speaker, a tape deck, a video camera, and a cassette tray.

* * * * *